US005981907A

United States Patent [19]

Maue

[11] Patent Number: 5,981,907

[45] Date of Patent: Nov. 9, 1999

[54] REAR WIPER MONITORING THEFT DETERRENT CIRCUIT

[75] Inventor: H. Winston Maue, Farmington Hills, Mich.

[73] Assignee: UT Automotive Dearborn, Inc., Dearborn, Mich.

[21] Appl. No.: 08/947,734

[22] Filed: Oct. 9, 1997

[51] Int. Cl.[6] .............................. B60L 1/02; H05B 3/06; G08B 15/00

[52] U.S. Cl. ......................... 219/203; 219/219; 219/522; 116/6

[58] Field of Search .................................... 219/203, 522; 244/121, 134; 296/84.1; 340/590, 652, 661, 541, 426; 116/6, 33, 75; 361/60, 63, 87; 318/317

[56] References Cited

U.S. PATENT DOCUMENTS

| | | | |
|---|---|---|---|
| 2,659,237 | 11/1953 | Wood . | |
| 3,421,380 | 1/1969 | Mansour . | |
| 3,442,146 | 5/1969 | Simpson . | |
| 3,443,442 | 5/1969 | Schweihs . | |
| 3,443,455 | 5/1969 | Zugel . | |
| 3,468,164 | 9/1969 | Sutherland | 73/343 |
| 3,574,882 | 4/1971 | Petry . | |

(List continued on next page.)

FOREIGN PATENT DOCUMENTS

| | | |
|---|---|---|
| 822 178 | 11/1951 | Germany . |
| 3807087 A1 | 9/1989 | Germany . |
| 39 23 688 A1 | 1/1991 | Germany . |
| 43 13 363 A1 | 11/1993 | Germany . |
| 43 37 760 A1 | 5/1994 | Germany . |
| 56-22150 | 2/1981 | Japan . |
| 5-86761 | 4/1993 | Japan . |
| WO 96/33891 | 10/1996 | WIPO . |
| WO 96/33892 | 10/1996 | WIPO . |
| WO 96/33893 | 10/1996 | WIPO . |

OTHER PUBLICATIONS

"Goodheart–Wilcox Automotive Encyclopedia", William K. Toboldt, Larry Johnson, Steven W. Olive, 1989, pp. 723–727.

"Automotive Handbook", Bosch 3rd Edition, 1993, pp. 694–697.

"Kinematic Analysis of Mechanisms", 1959, J.E. Shigley, pp. 228–231.

"Genevamation Indexing Drives", Jan. 12, 1995 Catalog No. 693, Geneva Mechanisms Corporation.

"Saab 900 Owners Workshop Manual", Haynes Publishing Group, 1979 through 1985, pp. 172–174, 237.

Machine Design, "Basics of Design Engineering", Jun. 1992, Article "Mechanical Systems".

A paper from the Third Conference on Mechanisms, "A Survey of Intermittent–Motion", F.J.Bogardus, 1956, pp. 8–15.

(List continued on next page.)

*Primary Examiner*—Teresa Walberg
*Assistant Examiner*—Daniel Robinson
*Attorney, Agent, or Firm*—Harness, Dickey & Pierce, P.L.C.

[57] ABSTRACT

An apparatus and method for monitoring current flow through a resistive heating element and for detecting breakage of the heating element. In one preferred embodiment the heating element is disposed on a vehicle window. A current is passed through the heating element continuously, even when the vehicle ignition is turned off. A differential amplifier is used to generate a signal representative of the current flow through the heating element which is indicative of whether the heating element is functioning properly or has been broken. The signal is converted from an analog to a digital signal by an analog to digital convertor and then subsequently output to a controller or computer. From this signal the computer determines if the heating element has been broken. The apparatus and method can be used for a variety of functions, but has particular utility in detecting if a window supporting the heating element has been broken such as during an attempted theft.

9 Claims, 2 Drawing Sheets

U.S. PATENT DOCUMENTS

| | | | |
|---|---|---|---|
| 3,665,772 | 5/1972 | Beard et al. . | |
| 3,688,332 | 9/1972 | Bellware . | |
| 3,689,817 | 9/1972 | Elliott . | |
| 3,694,723 | 9/1972 | Schneider et al. . | |
| 3,760,265 | 9/1973 | Hutch | 324/51 |
| 3,803,627 | 4/1974 | Schuscheng . | |
| 3,917,330 | 11/1975 | Quantz . | |
| 3,927,436 | 12/1975 | Inoue et al. . | |
| 3,973,184 | 8/1976 | Raber | 324/51 |
| 4,009,952 | 3/1977 | Badalich et al. . | |
| 4,086,570 | 4/1978 | Wakasa et al. | 340/172 |
| 4,158,159 | 6/1979 | Orris et al. . | |
| 4,173,055 | 11/1979 | Izumi et al. . | |
| 4,183,114 | 1/1980 | Eden . | |
| 4,241,336 | 12/1980 | Schonken | 340/518 |
| 4,259,624 | 3/1981 | Seibicke . | |
| 4,271,381 | 6/1981 | Munz et al. . | |
| 4,309,646 | 1/1982 | Liedtke et al. . | |
| 4,336,482 | 6/1982 | Goertler et al. . | |
| 4,352,299 | 10/1982 | Riggs et al. . | |
| 4,389,694 | 6/1983 | Cornwell | 361/48 |
| 4,410,843 | 10/1983 | Sauer et al. | 318/317 |
| 4,422,522 | 12/1983 | Slavin et al. . | |
| 4,434,678 | 3/1984 | Maus . | |
| 4,492,904 | 1/1985 | Graham . | |
| 4,551,668 | 11/1985 | Kammiller | 323/234 |
| 4,553,656 | 11/1985 | Lense . | |
| 4,573,723 | 3/1986 | Morita et al. . | |
| 4,639,065 | 1/1987 | Kohler et al. . | |
| 4,660,698 | 4/1987 | Miura . | |
| 4,674,781 | 6/1987 | Reece et al. . | |
| 4,702,117 | 10/1987 | Tsutsumi et al. . | |
| 4,733,147 | 3/1988 | Muller et al. . | |
| 4,878,398 | 11/1989 | Heinrich . | |
| 4,885,512 | 12/1989 | Gille et al. . | |
| 4,893,039 | 1/1990 | Isii . | |
| 4,894,514 | 1/1990 | Delvin | 219/203 |
| 4,918,272 | 4/1990 | Nishikawa . | |
| 4,990,749 | 2/1991 | Devine et al. | 219/385 |
| 5,007,131 | 4/1991 | Chevalier et al. . | |
| 5,023,530 | 6/1991 | Ohashi et al. . | |
| 5,045,741 | 9/1991 | Dvorsky . | |
| 5,063,317 | 11/1991 | Bruhn . | |
| 5,182,957 | 2/1993 | Bohmer et al. . | |
| 5,218,255 | 6/1993 | Horiguchi . | |
| 5,222,775 | 6/1993 | Kato . | |
| 5,228,239 | 7/1993 | Heo . | |
| 5,251,114 | 10/1993 | Cantin et al. . | |
| 5,274,875 | 1/1994 | Chou . | |
| 5,291,109 | 3/1994 | Peter . | |
| 5,333,351 | 8/1994 | Sato . | |
| 5,355,061 | 10/1994 | Forhan . | |
| 5,355,286 | 10/1994 | Flint . | |
| 5,418,464 | 5/1995 | Swift | 324/537 |
| 5,519,258 | 5/1996 | Stroven et al. . | |
| 5,694,812 | 12/1997 | Maue et al. . | |

OTHER PUBLICATIONS

Machine Design, Mechanisms for Intermittent Motion, Dec. 1951, Otto Lichwitz, pp. 134–148.

"Mechanisms for Providing Intermittent Rotary Motion", Product Engineering, Aug. 1949, pp. 116–117.

Machine Design, Mechanisms for Intermittent Motion, "Part 2", Jan. 1952, Otto Lichtwitz, pp. 127–141.

Machine Design, Mechanisms for Intermittent Motion, "Part 3", Feb. 1952, Otto Lichwitz, pp. 146–155.

Machine Design, Mechanisms for Intermittent Motion, "Part 4", Mar. 1952, Otto Lichwitz, pp. 147–155.

A paper from the Third Conference on Mechanisms, "Designing for Intermittent Motion with Modified Starwheels", Karl E. Kist, pp. 16–20.

"Mechanisms for Engineering Design" "Motion, Circular, Intermittent", Chapter 3, S.B. Tuttle, John Wiley Co., pp. 33–51.

Machine Design, "Modifying Starwheel Mechanisms", Vandeman and Wood, Apr. 1953, pp. 255–261.

"Kinematics of Intermittent Mechanism III—The Spherical Geneva Wheel", Product Engineering, Oct. 1949, S. Rappaport, pp. 137–139.

Machine Design, "Mechanical Systems", Jun. 1992, pp. 130, 132, 168.

"Mechanisms and Dynamics of Machinery", Hamilton H. Mabie and Fred W. Ocvirk, John Wiley & Sons, 1957.

A paper from the International Congress & Exposition, SAE Technical Paper Series 960390, "Liftgate Multiplexed Node", Feb. 1996, H. Winston Maue, pp. 73–76.

REAR WIPER MONITORING THEFT DETERRENT CIRCUIT

BACKGROUND OF THE INVENTION

1. Technical Field

This invention relates to systems for monitoring electrical components of an automotive vehicle, and more particularly to a system and method for monitoring current flow thorough a resistive heating element of a window defogger/defroster circuit and determining if current flow through the heating element has been interrupted so as to determine if the window has been broken, such as during a theft.

2. Discussion

Many automotive vehicles employ one or more electrically resistive heating elements embedded in or secured onto an outer surface of a window of the vehicle, such as a rear window. When a current is passed through the heating element the heating element becomes very hot, thus defogging and/or defrosting the window.

It would be highly desirable to provide some form of system and method for monitoring the current flow through the resistive heating element to determine if the heating element becomes damaged and/or broken. This, in turn, could be used to provide an indication that the window on which the resistive heating element is disposed on or embedded into has been broken, thus indicating a possible attempted theft of the vehicle. Such a system and method could also be used to determine if a break has developed in the resistive heating element, thus reducing troubleshooting and diagnostic service time which might be required to make such a determination.

It is therefore a principal object of the present invention to provide a method and apparatus for monitoring current flow through a resistive heating element attached to or embedded within a window of an automotive vehicle, which system and method is capable of determining if the resistive heating element has been broken.

Furthermore, it is another object of the present invention to provide a method and apparatus for monitoring current flow through a resistive heating element secured to or embedded within a window of a vehicle, where the method and apparatus is simple to construct, relatively low in cost and low in space requirements.

SUMMARY OF THE INVENTION

The above and other objects are provided by a method and apparatus for monitoring a window defogger/defroster circuit in accordance with preferred embodiments of the present invention. In one preferred embodiment the apparatus of the present invention comprises an amplifier for monitoring a current flow through a resistive heating element secured to or embedded within a window of a vehicle. A trickle current is also continuously applied to the heating element regardless if the operator of the vehicle has turned on the heating element. The amplifier generates an output signal having a first value if there are no breaks in the heating element (i.e., if there is continuity). The amplifier also generates a second signal if continuity is lost, thus indicating that the heating element has been broken. The output signal of the amplifier is then monitored by a controller or computer which uses the output signal from the amplifier to detect if the heating element has been broken. In this manner, continuously monitoring the current flow through the resistive heating element enables the computer or controller to detect if the window supporting the heating element has been broken, such as during an attempted theft. Monitoring the current flow through the heating element can also be used as a diagnostic tool because the computer or controller is able to quickly determine that current flow through the heating element has been disrupted, even when the heating element is not in use.

In one preferred embodiment the amplifier comprises a differential amplifier which provides an output signal to an analog to digital convertor. The analog-to-digital converter converts the analog output signal from the amplifier into a corresponding digital value which is then output to the controller. Accordingly, the apparatus has a limited number of component parts, is relatively inexpensive and compact, and does not add appreciably to the overall weight or cost of the vehicle.

BRIEF DESCRIPTION OF THE DRAWINGS

The various advantages of the present invention will become apparent to one skilled in the art by reading the following specification and subjoined claims and by referencing the following drawings in which:

DETAILED DESCRIPTION OF THE PREFERRED EMBODIMENTS

Figure 1:
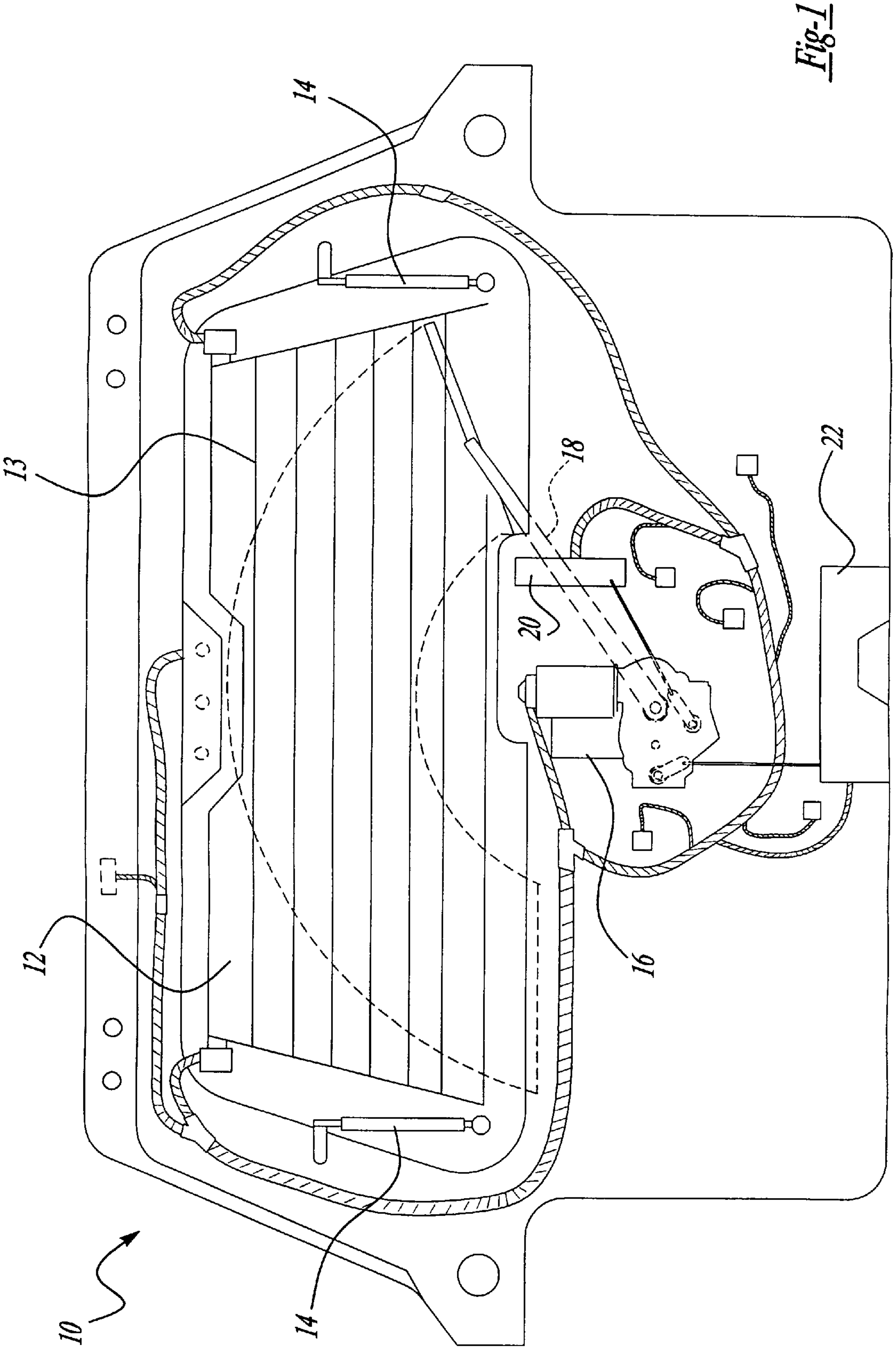
FIG. 1 is an elevational view of a rear lift gate of a vehicle incorporating a resistive heating element disposed on a rear window of the lift gate and a central drive and power transmission unit for controlling various components associated with the lift gate.

Referring to FIG. 1, a lift gate 10 for an automotive vehicle such as a minivan, car or truck is illustrated. The lift gate 10 includes an upper pair of hinges (not visible) coupled to the body structure of the vehicle. When the lift gate is pivoted to an open position, a cargo space is accessible from behind the vehicle. The lift gate 10 includes a rear window 12 which, in this example, is pivotable between a closed position, substantially flush with the outer surface of the lift gate 10, to an open position about the upper hinges. A pair of pneumatic cylinders 14 act to dampen movement of the window 12 toward the open position when a lower portion of the window 12 is released. An electrically resistive heating element 13 is secured to or embedded in the window 12. The heating element is used to defog and defrost the rear window 12 by applying a current therethrough, which causes the element 13, which has a very low electrical resistance (on the order of about 2 ohms), to become very hot. The heating element itself is a standard component widely available from a variety of manufacturers.

A multi-functional apparatus 16 is included for controlling operation of a wiper arm 18, a window release latch 20 and a lift gate lock 22. Details of the construction of the apparatus 16 may be found in the disclosure of U.S. application Ser. No. 08/431,148, which is hereby incorporated by reference.

The foregoing has been intended as an overview of one exemplary application of the present invention, that is, on a rear window 12 of an automotive vehicle. It will be appreciated, immediately, however that the principles of the present invention may be applied to a variety of applications where it is desirable to continuously monitor the operation of a resistive element and to determine immediately if the element has been broken.

Figure 2:
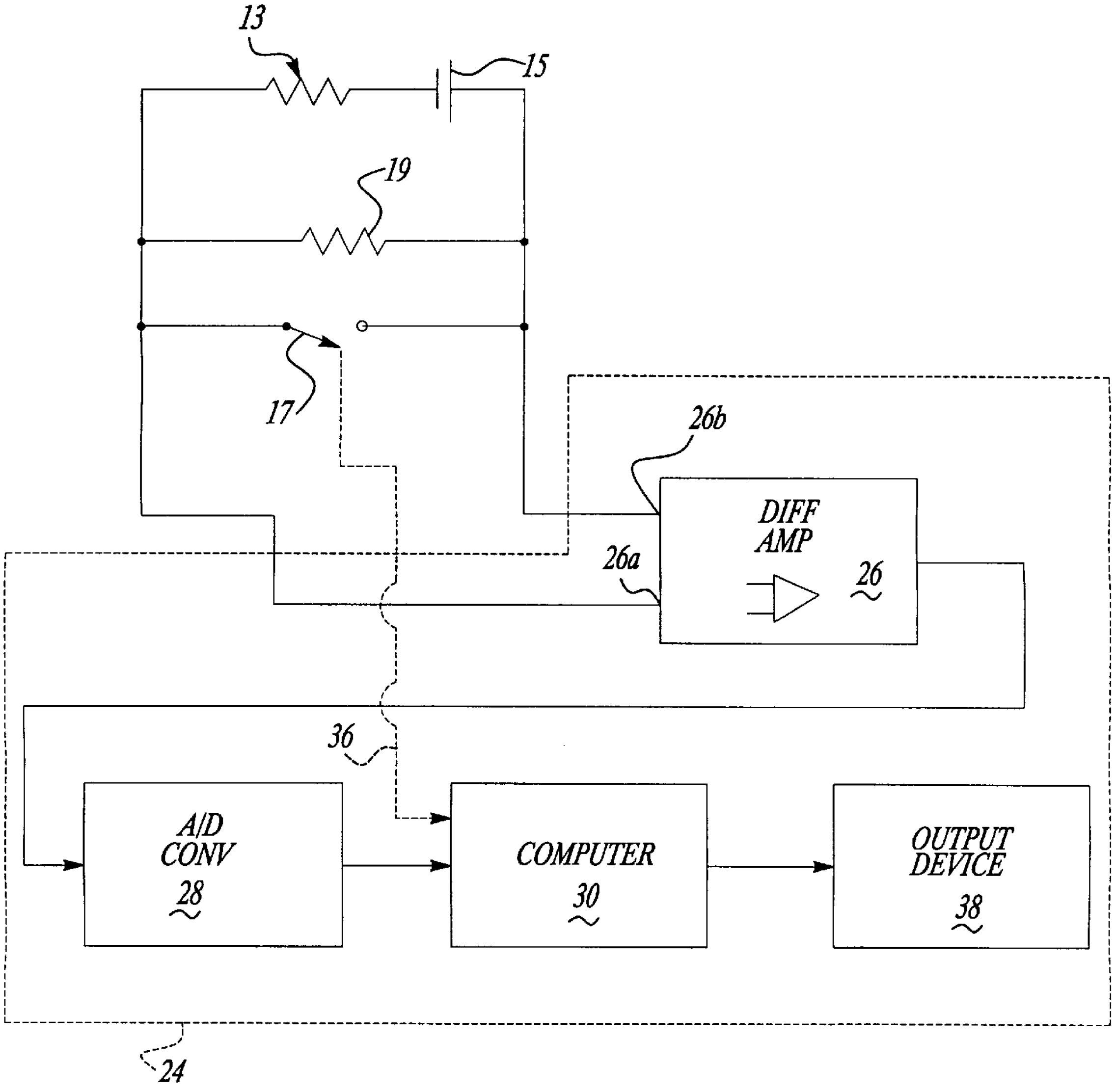
FIG. 2 is a schematic diagram of the apparatus of the present invention used in connection with the lift gate shown in FIG. 1.

Referring to FIG. 2, an apparatus 24 in accordance with the present invention is shown for monitoring the operation of the resistive heating element 13. The heating element 13 is configured in series with a battery 15 of the vehicle and with a load resistor 19. A switch 17 is coupled in parallel with the load resistor. The switch operates in connection with the vehicle's ignition switch and is normally in the open position when the vehicle ignition switch is in its "off" position.

The apparatus 24 generally comprises a differential amplifier 26, an analog-to-digital convertor 28 and a controller or computer 30. The differential amplifier 26 has a first input 26*a* which is coupled to one side of the heating element 13 and the load resistor 19, and a second input 26*b* which is coupled to the opposite side of the load resistor 19 and switch 17, thus placing the amplifier 26 across load resistor 19 like a volt meter.

The differential amp 26 functions as a form of volt meter to monitor the voltage across the load resistor 19 (typically a 10K ohm resistor) by amplifying the voltage difference of the magnitudes of the signals on its inputs 26*a* and 26*b* and generating an output signal at an output 26*c* representative of the voltage drop across the load resistor 19. If the heating element 13 is not broken and is functioning properly, a first signal will be generated at the output 26*c*. Since the electrical resistance of the heating element is very low (typically about 2 ohms or less), if the element 13 is functioning properly (i.e., has no breaks disrupting continuity), then the voltage drop across the heating element 13 will be negligible, and essentially the entire battery voltage will appear across load resistor 19. However, if the heating element 13 is broken, then a negligible voltage across the load resistor 19 will be present and the amplifier 26 will generate a second signal having a magnitude indicative of this condition. Thus, by monitoring the voltage drop across the load resistor, it can be detected when the heating element 13 is broken.

With further reference to FIG. 2, the signal from the output of the differential amplifier 26 is then fed into the A/D convertor 28 where it is converted from an analog value to a corresponding digital value. The digital value is then output to the computer 30. The computer 30 determines from the output signal of the A/D convertor whether there has been a break in the heating element 13 by comparing the magnitude of the output signal from the A/D convertor 28 with a reference value stored in a memory (not shown) of the computer 30. This memory may be a random access memory (RAM) or a read only memory (ROM).

Accordingly, by continuously applying a small trickle current to the heating element 13 when the vehicle ignition is turned on, and continuously monitoring the voltage drop across the load resistor 19, an instantaneous determination can be made if the heating element 13 is broken or becomes damaged for any reason, and a signal sent to an output device 38 indicating same.

If an operator of the vehicle turns on the ignition switch, thus causing switch 17 to close, then load resistor 19 will be shorted, and the full battery 15 voltage will appear across the heating element 13. In this situation, the voltage drop across the load resistor 19 would go to essentially zero. Since the computer 30 would ordinarily not be able to distinguish between this situation and a break in continuity of the heating element 13, some means must be included for informing the computer 30 that the vehicle's ignition switch has been turned on. This is accomplished by an input 36 which informs the computer 30 when the switch 17 is closed. If this signal is present on input line 36, then the computer 30 does not interpret the output signal from the differential amplifier 26 as having a break in continuity.

While the present invention has widespread utility, it is anticipated that one specific application will be in detecting if a window on which the heating element 13 is mounted or embedded within is broken, such as during an attempted theft. In this event, the computer 30 would instantaneously detect the breakage of the heating element 13 and can be used in connection with other vehicle systems, such as an independent vehicle alarm system, to signal that a theft is being attempted.

Those skilled in the art can now appreciate from the foregoing description that the broad teachings of the present invention can be implemented in a variety of forms. Therefore, while this invention has been described in connection with particular examples thereof, the true scope of the invention should not be so limited since other modifications will become apparent to the skilled practitioner upon a study of the drawings, specification and following claims.

What is claimed is:

1. An automotive vehicle control and monitoring apparatus for monitoring current flow through a electrically resistive heating element on a window of a vehicle and determining if said current flow is interrupted, said apparatus comprising:

a load resistor coupled across said heating element;

a switch coupled across said load resistor;

a controller responsive to a position of said switch;

a circuit coupled directly across said load resistor and responsive to a current flow through said load resistor for providing a signal indicative of whether said current flow through said heating element has been interrupted by breakage of said heating element;

said controller further being responsive to said signal for determining if said current flow through said heating element has been interrupted and said controller further being responsive to actuation of said switch.

2. The apparatus of claim 1, wherein said circuit comprises a differential amplifier for monitoring said current flow through said heating element and generating said signal indicative of whether said current flow through said heating element has been interrupted.

3. The apparatus of claim 2, further comprising an analog-to-digital convertor responsive to said signal from said differential amplifier for converting said signal from an analog to a digital signal.

4. The apparatus of claim 1, wherein said circuit comprises a differential amplifier for receiving said input current and an output current from said heating element and providing said signal indicative of whether said current flow through said heating element has been interrupted;

an analog-to-digital convertor responsive to said differential amplifier for converting said signal from an analog signal to a digital signal; and said controller being responsive to said digital signal for determining if said current flow through said heating element has been interrupted.

5. An automotive vehicle monitoring apparatus for monitoring current flow through an electrically resistive heating element on a window of a vehicle and determining if said current flow through said heating element is interrupted, thereby indicating breakage of said heating element, said apparatus comprising:

a load resistor coupled directly across said heating element for monitoring voltage across said load resistor;

a switch coupled cross said load resistor;

a controller for continuously applying an input trickle current to said heating element regardless if said heating element is in a non-operating mode;

a circuit coupled to said load resistor for monitoring said input trickle current through said heating element and a position of said switch, and the voltage across said load resistor and providing a signal in response thereto when said switch is in a closed position;

said controller further being responsive to said signal for determining, from said signal, if said input trickle current through said heating element has been interrupted by breakage of said heating element.

6. The apparatus of claim 5, wherein said circuit for monitoring said input trickle current comprises a differential amplifier having a first input coupled to a first side of said heating element and a second input coupled to an output side of said heating element, and wherein said circuit is further coupled in parallel with said load resistor.

7. The apparatus of claim 5, further comprising an analog-to-digital convertor responsive to an output of said circuit for monitoring said input trickle current and converting said output from an analog signal to a digital signal.

8. A method for monitoring current flow through an electrically resistant heating element on a window of a vehicle and determining if said current flow through said heating element is interrupted, thereby indicating breakage of said heating element, said method comprising the steps of:

applying a continuous trickle current from a battery to said heating element regardless if said heating element is in use;

disposing a load resistor and a switch both directly in parallel across said heating element and said battery using said load resistor to monitor said current flow through said heating element and generating a first analog signal if said current is detected as flowing completely through said heating element and a second analog signal if said current is detected as not flowing through said heating element; and using a monitoring circuit responsive to said analog signals to convert said analog signals into digital signals using a controller to interpret said digital signals to determine if said heating element has been broken.

9. The method of claim 8, wherein the step of using a monitoring circuit comprises using a differential amplifier to generate said first analog signal indicating that said current flow through said heating element has not been interrupted and said second analog signal indicating that said current flow has been interrupted because of breakage of said heating element.

* * * * *